United States Patent

[11] 3,557,897

| [72] | Inventors | James M. Conner<br>South Pasadena, Calif.;<br>Harold G. Borsheim; Laurence G. Safe,<br>Dubuque, Iowa |
|---|---|---|
| [21] | Appl. No. | 763,080 |
| [22] | Filed | Sept. 27, 1968 |
| [45] | Patented | Jan. 26, 1971 |
| [73] | Assignee | Deere & Company<br>Moline, Ill.<br>a corporation of Delaware |

[54] VEHICLE INSTRUMENT PANEL COVER
5 Claims, 3 Drawing Figs.

[52] U.S. Cl. ..................................................... 180/90,
290/70
[51] Int. Cl. ....................................................... B60k 35/00
[50] Field of Search........................................... 180/90;
296/70; 312/291

[56] References Cited
UNITED STATES PATENTS

| 1,445,181 | 2/1923 | Sizaire........................ | 180/90 |
| 2,039,503 | 5/1936 | Tjaarda....................... | 180/90 |
| 3,452,835 | 7/1969 | Deli et al..................... | 180/90 |

*Primary Examiner*—Leo Friaglia
*Assistant Examiner*—Robert R. Song
*Attorneys*—H. Vincent Harsha, Harold M. Knoth, William A. Murray and John M. Nolan ABSTRACT: A four-wheel drive articulated loader has an elevated operator's station with a pair of forward instrument panels facing the operator on opposite sides of the steering wheel. A pair of instrument panel covers are mounted on transverse hinges below the instrument panels to swing between an open position, wherein they are folded back and latched under the instrument panel, and a closed position, wherein they are locked over the instrument panel.

PATENTED JAN 26 1971 3,557,897

INVENTORS
J.M. CONNER, H.G. BORSHEIM &
L.G. SAFE

VEHICLE INSTRUMENT PANEL COVER

BACKGROUND OF THE INVENTION

This invention relates to a vandal-proof instrument panel cover for industrial equipment or the like.

Many types of industrial equipment are frequently left at the job site between working hours and since they are unprotected, they are subject to frequent incidents of vandalism. One type of vandalism often encountered is the breakage of glass and other damage to the instrument panel at the operator's station. Since proper functioning instruments are vital to the proper and safe operation of the machine, it is necessary to replace the damaged instruments, resulting in substantial expense and downtime for the machine while the repairs are being made.

SUMMARY OF THE INVENTION

According to the present invention, a sturdy, lockable cover is provided for protecting the instrument panel of an industrial vehicle or the like when the vehicle is not in use. More specifically, a self-storing type instrument panel cover is provided, so that the instrument panel cover does not have to be removed when the machine is in operation, but rather folds back underneath the instrument panel to a position wherein it will not interfere with the vehicle operator in the operation of the machine. Still another feature of the invention resides in the simple and durable construction of the instrument panel cover and the means for locking it over the instrument panel.

DESCRIPTION OF THE PREFERRED EMBODIMENT

Figure 1:
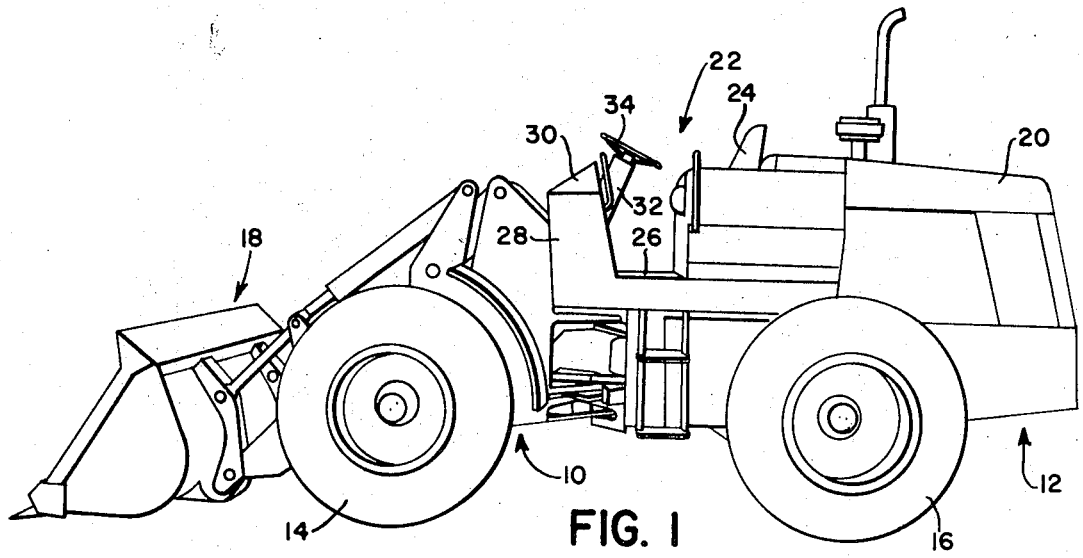
FIG. 1 is a side elevation view of an industrial vehicle embodying the present invention.

The industrial vehicle chosen to illustrate the invention is an articulated four-wheel drive loader having front and rear sections 10 and 12 respectively, which are connected by a central vertical pivot so that the front and rear sections are swingable relative to one another about a vertical axis to steer the vehicle. The front section 10 is supported on a pair of driven front wheels 14 and the rear section 12 is mounted on a pair of driven rear wheels 16. A conventional bucket-type loader mechanism, indicated in its entirety by the numeral 18, is carried by the front section, while the vehicle's engine (not shown) is carried by the rear section 12, the engine being disposed within the rearward hood 20.

Also carried by the rear section, at the forward end thereof, is an elevated operator's station, indicated in its entirety by the numeral 22. The operator's station includes a seat 24 and a relatively horizontal floor 26, which extends forwardly of and below the front edge of the seat 24. A generally upright arcuate front wall 28 extends upwardly from the forward edge of the floor 26 to define the front end of the operator's station, the front wall 28 being concave rearwardly toward the seat and substantially enclosing the forward end of the floor 26 from the front and the sides, the various conventional foot controls being situated within the enclosed area. The front wall has an upwardly and rearwardly inclined top portion 30 which overlies the forward enclosed portion of the floor 26. A steering column 32 extends upwardly and rearwardly from the forward end of the floor 26 in the fore-and-aft centerline of the operator's station and terminates immediately to the rear of the rear edge of the top wall portion 30 forwardly of the seat 24, and a steering wheel 34 is mounted at the upper end of the steering column in the conventional manner, wherein it can be manipulated by the operator from the seat 24.

Mounted within the upper portion of the enclosure formed by the arcuate front wall 28 and its top portion 30, is an instrument panel housing 36 extending the entire width of the arcuate front wall 28 forwardly of the steering column 32. The instrument panel housing includes a generally upright slightly rearwardly inclined rear wall 38, having its upper edge conforming to and attached to the top portion 30, and a generally horizontal bottom wall 40, having its forward edge attached to and conforming to the arcuate front wall 28, the rearward edge of the bottom wall and the lower edge of the rear wall merging to form a horizontal transverse corner edge extending the width of the operator's station. The rear wall 38 is provided with a pair of symmetrical, relatively large openings 42 on opposite sides of the steering column 32, and an instrument panel 44 is removably mounted over each opening 42 by means of conventional fasteners. Each instrument panel carries a number of conventional instruments 46, the instruments 46 being schematically illustrated and including such instruments as the fuel gauge, oil pressure gauge, temperature gauge, tachometer, warning lights, and ignition lock, the indicator portions of the instruments facing the seat 24 and the wiring and associated components of the instrument being disposed within the cavity formed by the instrument panel housing 36 and the front and top wall portions 28 and 30. The instrument panels 44 have substantially the same irregular shape as the openings 42, and the two instrument panels are symmetrical about the centerline of the operator's station, the various instruments being divided between the two panels 44.

Figure 2:
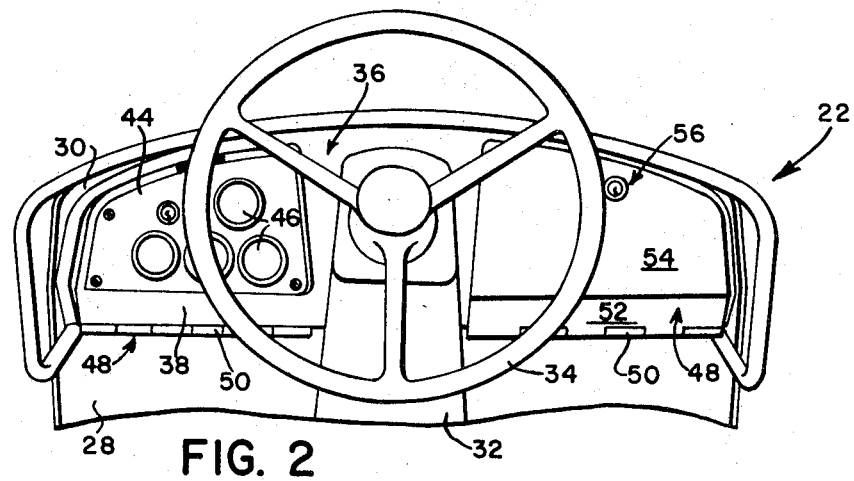
FIG. 2 is a perspective view of the instrument panel area of the vehicle looking forwardly from the operator's seat on the vehicle, with one of the instrument panel covers shown locked in its closed position, and the other cover folded back into its open or operating position.
Figure 3:
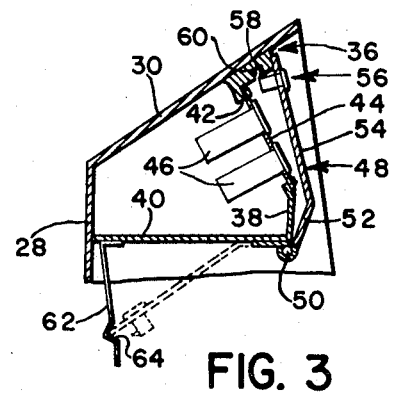
FIG. 3 is a vertical fore-and-aft section through one of the instrument panels and its associated cover, showing the cover locked into its closed position, and showing the alternate, open position in broken lines.

A pair of instrument panel covers, indicated generally by the numeral 48, are respectively mounted on the instrument panel housing 36 by means of transverse pivots or hinges 50 at the lower rearward edge of the housing 36. Like the instrument panels, the two instrument panel covers 48 are mirror images of one another and symmetrical about the centerline of the operator's station. Each cover 48 is relatively flat and includes a generally rectangular inner or lower portion 52, the lower or inner edge of which is connected to the hinge 50, and a generally trapezoidal-shaped outer portion 54, which has substantially the same shape as the instrument panel with which it is associated and merges with the inner part 52 at a relatively small angle forming a transversely extending bend in each cover 48. Each cover 48 is swingable on its hinge 50 between a closed or upright position wherein it engages the outer surface of the rear wall 38 and covers the associated instrument panel 44, and a horizontal or open position wherein it is folded back underneath the bottom wall 40 of the housing 36 with the inner part 52 of the cover being disposed adjacent to and below the bottom wall 40. The right-hand cover 48 in FIG. 2 is shown in the closed position, the cover also being shown in its closed position in FIG. 3, while the left-hand cover 48 is shown in its open position in FIG. 2, the open position of the cover being illustrated in dotted lines in FIG. 3.

The covers are lockable in their closed position by a conventional key-operated locking device 56 on each cover 48, the locking device 56 having a rotatable tooth 58 which is turnable only by a key in the locking device to engage and disengage a recess 60 in the panel housing 36. The covers 48 are releasably maintained in their open or folded-under position by a latching device 62, here shown as a deflectable strap depending from the bottom 40 of the instrument panel housing and having a recess 64 engageable with the outer edge of the cover, the latch being biased rearwardly (to the right in FIG. 3) so that it holds the cover in the recess 64 and releases the cover when the latch is deflected in a forward direction (to the left in FIG. 3).

Before the vehicle is started, the two instrument panel covers 48 are unlocked by means of the key-operated locks 56, the keys of which are in the possession of authorized personnel, and the covers are swung downwardly on their hinges 50 through approximately 270° to their open or folded-back position wherein they are substantially horizontal and adjacent to the bottom wall 40 of the instrument panel housing, the open position being defined by engagement of the bottom wall 40 by the inner cover part 52. As the covers swing into their open position, they deflect the latch 62 until the edge of the cover is received in the recess 64, whereupon the latch springs rearwardly to hold the cover in its open position. At the end of the day, when the vehicle is to be left unattended, the covers are swung to their closed position, wherein they completely cover the instrument panels, and locked therein, so that unauthorized personnel have no access to the instrument panel. As is apparent, the covers are made of rigid and durable material and can withstand considerable abuse from vandals. Also, the covers are easily shiftable between their alternate positions, so that the vehicle operators will not be discouraged from utilizing their protection. Furthermore, since the covers are self-storing, they are unlikely to become misplaced.

We claim:

1. In a vehicle having an operator's station including an operator's seat, a floor, and a generally upright front wall rising from the forward part of the floor, and at least one instrument panel forwardly of and facing the seat and rearwardly of the front wall, the improvement comprising: an instrument panel cover element associated with each instrument panel; horizontal pivot means operatively mounting each cover element on the vehicle for swinging movement between a first position wherein the cover element covers the instrument panel and a second position wherein it is disposed below the instrument panel with its free end disposed forwardly of said pivot means; lock means operatively associated with each cover element to releasably lock the cover element in its first position; and latch means operatively associated with each cover element for releasably holding the element in its second position.

2. The invention defined in claim 1 wherein the vehicle includes a steering wheel forwardly of the seat and a pair of instrument panels are respectively disposed on opposite sides of the steering wheel and a pair of cover elements are respectively disposed on opposite sides of the steering wheel for covering the respective instrument panels.

3. The invention defined in claim 2 wherein the vehicle has an instrument housing attached to the front wall above the floor and operatively supporting the instrument panels and the pivot means are mounted on the instrument housing adjacent the lower rearward edge of the housing, whereby the covers are disposed generally rearwardly of the housing in their first position and below the housing in their second position.

4. The invention defined in claim 3 wherein the instrument housing includes a generally horizontal bottom wall and the cover elements are disposed in a generally horizontal condition below and adjacent to the bottom wall in their second position.

5. The invention defined in claim 4 wherein the lock means includes a key-operated locking member mounted on each cover element and engageable with the instrument housing to lock the cover in its first position.